(12) United States Patent
Suemasa

(10) Patent No.: US 12,100,552 B2
(45) Date of Patent: Sep. 24, 2024

(54) CERAMIC ELECTRONIC COMPONENT AND METHOD OF MANUFACTURING THE SAME

(71) Applicant: TAIYO YUDEN CO., LTD., Tokyo (JP)

(72) Inventor: Riki Suemasa, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 58 days.

(21) Appl. No.: 18/048,744

(22) Filed: Oct. 21, 2022

(65) Prior Publication Data

US 2023/0137809 A1 May 4, 2023

(30) Foreign Application Priority Data

Nov. 4, 2021 (JP) .................................. 2021-180229

(51) Int. Cl.
*H01G 4/12* (2006.01)
*H01G 4/008* (2006.01)
*H01G 4/012* (2006.01)
*H01G 4/30* (2006.01)

(52) U.S. Cl.
CPC .............. *H01G 4/12* (2013.01); *H01G 4/008* (2013.01); *H01G 4/012* (2013.01); *H01G 4/306* (2013.01)

(58) Field of Classification Search
CPC .......... H01G 4/008; H01G 4/012; H01G 4/12; H01G 4/306
See application file for complete search history.

(56) References Cited

U.S. PATENT DOCUMENTS

| 2004/0090721 | A1* | 5/2004 | Nagai | ...................... H01C 1/14 361/15 |
| 2009/0237859 | A1* | 9/2009 | Nakamura | ............... H01G 4/33 156/89.12 |
| 2022/0157523 | A1* | 5/2022 | Lee | ...................... H01G 4/0085 |

FOREIGN PATENT DOCUMENTS

WO     2008072448 A1    6/2008

OTHER PUBLICATIONS

Polotai et al., Effect of Cr additions on the microstructural stability of Ni electrodes in ultra-thin BaTiO3 multilayer capacitors, Journal of electroceramics, vol. 18, 261-268, Aug. 2007 (9 pages).

* cited by examiner

*Primary Examiner* — Nathan Milakovich
(74) *Attorney, Agent, or Firm* — Law Office of Katsuhiro Arai

(57) ABSTRACT

A ceramic electronic component includes a multilayer chip in which dielectric layers, which contain ceramic as a main component, and internal electrode layers, which contain a first metal as a main component, are alternately stacked, wherein one face of first and second faces opposite to each other in a stack direction of each of the internal electrode layers is covered with a metal oxide film of a second metal that is more easily oxidized than the first metal and the other face of the first and second faces is not covered with the metal oxide film, or the one face is covered with the metal oxide film and an area of the metal oxide film covering the other face is smaller than an area of the metal oxide film covering the one face.

14 Claims, 13 Drawing Sheets

CERAMIC ELECTRONIC COMPONENT AND METHOD OF MANUFACTURING THE SAME

CROSS-REFERENCE TO RELATED APPLICATION

This application is based upon and claims the benefit of priority of the prior Japanese Patent Application No. 2021-180229, filed on Nov. 4, 2021, the entire contents of which are incorporated herein by reference.

FIELD

A certain aspect of the present disclosure relates to a ceramic electronic component and a method of manufacturing the same.

BACKGROUND

In recent years, there has been an increasing demand for high-end multilayer ceramic capacitors having high capacitance and high reliability in in-vehicle terminals, portable terminals, and the like. High-end multilayer ceramic capacitors are used in applications such as DC decoupling, noise bypassing, and voltage stabilization in high-frequency circuits and power circuits.

To achieve a small size and a high capacitance, thinning of internal electrode layers and dielectric layers of a multilayer ceramic capacitor has been advanced as disclosed in, for example, International Publication No. 2008/072448 (Patent Document 1). Note that the technique related to the present disclosure is also disclosed in Polotai, Anton V, et al. "Effect of Cr additions on the microstructural stability of Ni electrodes in ultra-thin $BaTiO_3$ multilayer capacitors." Journal of electroceramics 18.3-4 (2007): 261-268 (Non-Patent Document 1).

SUMMARY

However, there is a possibility that the internal electrode layers may rupture or the reliability of the dielectric layers may be lowered because of the reduction in thickness. For example, Patent Document 1 proposes to cause the internal electrode layers containing nickel (Ni) as a main component to contain chromium (Cr) to prevent spheroidization of the internal electrode layers and to enhance the continuity of each of the internal electrode layers. However, as reported in, for example, Non-Patent Document 1, it is known that Cr added to the internal electrode layer promotes the generation of oxygen defects at the interface between the internal electrode and the dielectric layer, and lowers the insulation reliability of the dielectric layer.

An object of the present disclosure is to provide a ceramic electronic component and a method for manufacturing the ceramic electronic component that achieve both continuity of each of the internal electrode layers and insulation reliability of dielectric layers.

According to an aspect of the present disclosure, there is provided a ceramic electronic component including: a multilayer chip in which dielectric layers, which contain ceramic as a main component, and internal electrode layers, which contain a first metal as a main component, are alternately stacked, wherein one face of first and second faces opposite to each other in a stack direction of each of the internal electrode layers is covered with a metal oxide film of a second metal that is more easily oxidized than the first metal and the other face of the first and second faces is not covered with the metal oxide film, or the one face is covered with the metal oxide film and an area of the metal oxide film covering the other face is smaller than an area of the metal oxide film covering the one face.

According to another aspect of the present disclosure, there is provided a method of manufacturing a ceramic electronic component, the method including: forming a stack unit by forming an internal electrode layer pattern on a dielectric green sheet by sputtering and forming a coating film pattern on one of first and second faces of the internal electrode layer pattern by sputtering, the internal electrode layer pattern containing a first metal as a main component, the coating film pattern containing a second metal, which is more easily oxidized than the first metal, as a main component; forming a multilayer structure by stacking the stack unit in a plurality; and firing the multilayer structure.

According to another aspect of the present disclosure, there is provided a method of manufacturing a ceramic electronic component, the method including: forming a stack unit by forming an internal electrode layer pattern on a dielectric green sheet; forming a multilayer structure by stacking the stack unit in a plurality; and firing the multilayer structure, wherein the forming of the internal electrode layer pattern includes forming a composite film containing a first metal and a second metal by sputtering at a ratio of the second metal of 1 at % to 5 at %, the second metal being is more easily oxidized than the first metal.

DETAILED DESCRIPTION

Hereinafter, an embodiment will be described with reference to the drawings.

Embodiment

Figure 1A:
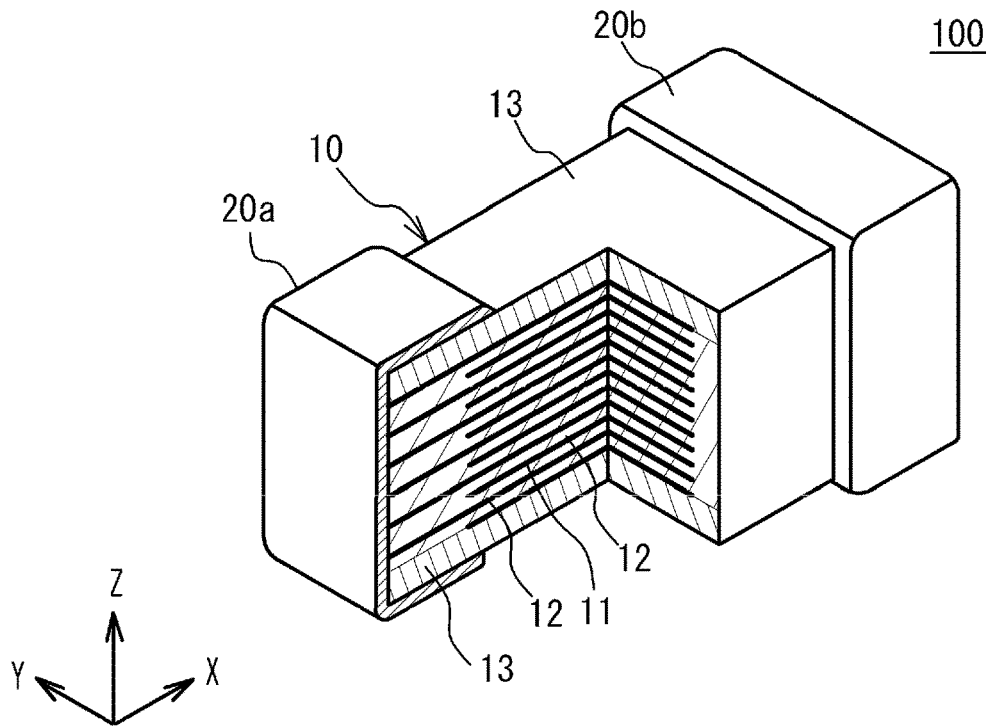
FIG. 1A is a partial cross-sectional perspective view of a multilayer ceramic capacitor.
Figure 1B:
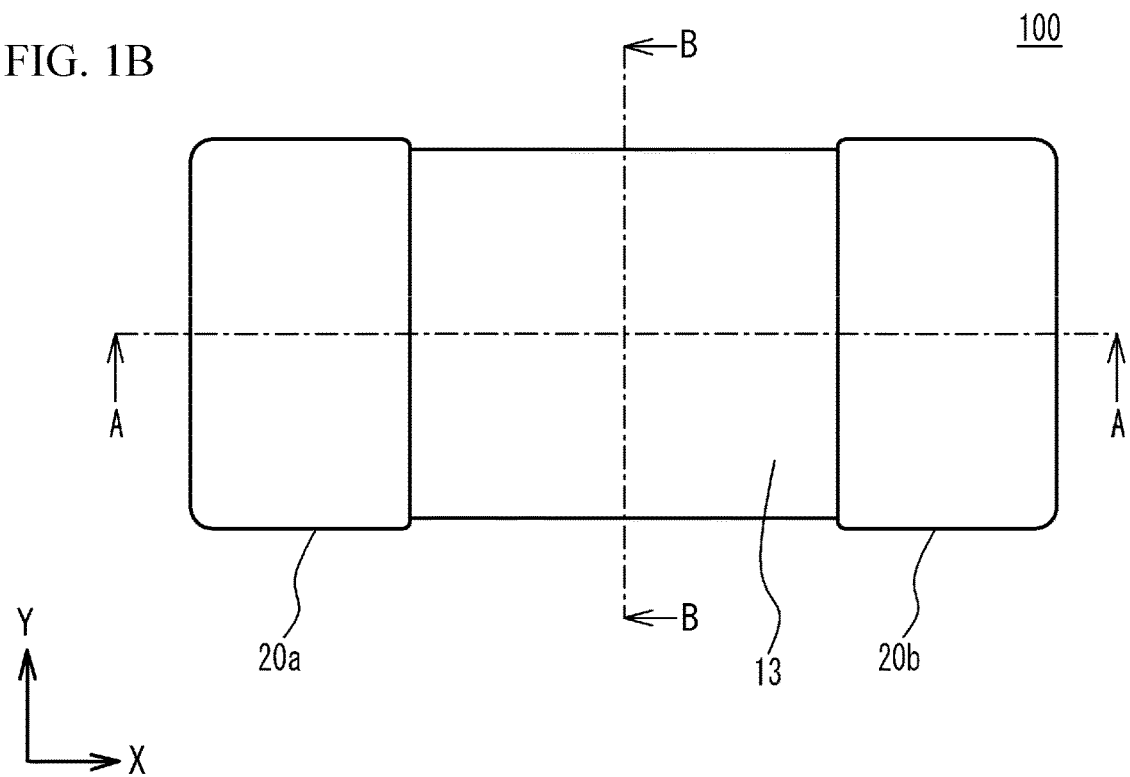
FIG. 1B is a top view of the multilayer ceramic capacitor.
Figure 2A:
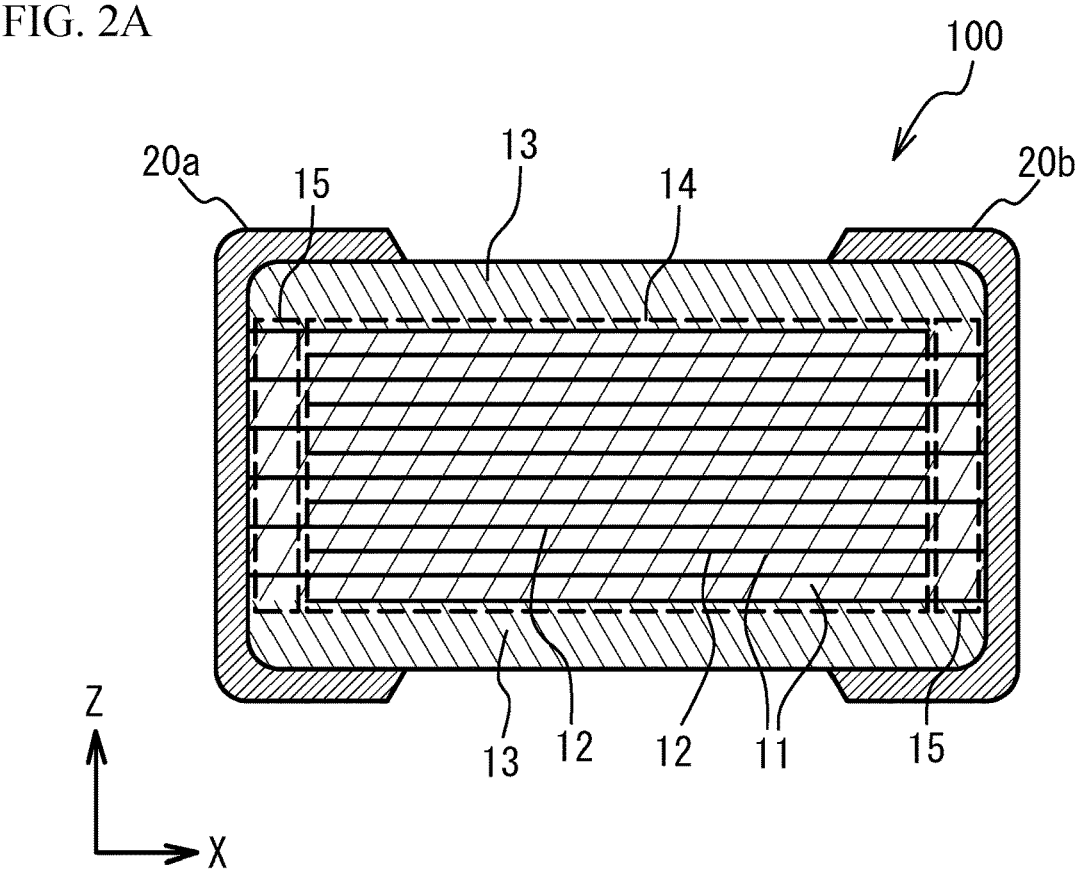
FIG. 2A is a cross-sectional view taken along line A-A in FIG. 1B.
Figure 2B:
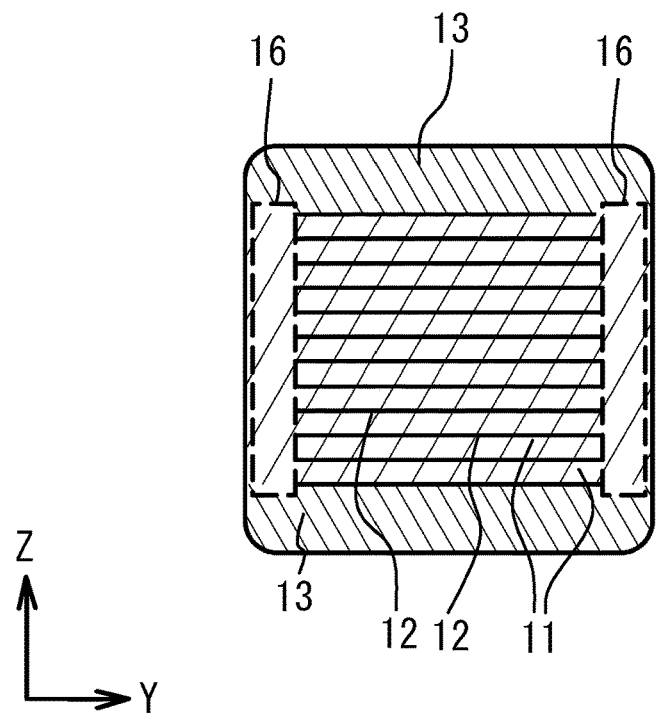
FIG. 2B is a cross-sectional view taken along line B-B in FIG. 1B.

FIG. 1A is a partial cross-sectional perspective view of a multilayer ceramic capacitor 100 in accordance with an embodiment, and FIG. 1B is a top view of the multilayer ceramic capacitor 100. FIG. 2A is a cross-sectional view taken along line A-A in FIG. 1B, and FIG. 2B is a cross-sectional view taken along line B-B in FIG. 1B.

As illustrated in FIG. 1A to FIG. 2B, the multilayer ceramic capacitor 100 includes a multilayer chip 10 having a substantially rectangular parallelepiped shape, and external electrodes 20a and 20b provided on two edge faces opposite to each other of the multilayer chip 10, respectively. Among the four faces other than the two edge faces of the multilayer chip 10, two faces other than the upper face and the lower face in the stack direction are referred to as side faces. Each of the external electrodes 20a and 20b extends on the upper face and the lower face in the stack direction and two side faces of the multilayer chip 10. The external electrodes 20a and 20b are spaced from each other.

The multilayer chip 10 has a structure in which dielectric layers 11, which contain a ceramic material functioning as a dielectric, and internal electrode layers 12, which contain a base metal material, are alternately stacked. The edges of the internal electrode layers 12 are alternately exposed to a first edge face and a second edge face of the multilayer chip 10. The external electrode 20a is provided on the first edge face, while the external electrode 20b is provided on the second edge face. Thus, the internal electrode layers 12 are alternately electrically connected to the external electrode 20a and the external electrode 20b. As a result, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the internal electrode layers 12 are disposed as the outermost layers in the stack direction, respectively, and the upper face and the lower face of the multilayer structure are covered with cover layers 13, respectively. The cover layer 13 contains a ceramic material as a main component. For example, the material of the cover layer 13 may have the same main component of the ceramic material as that of the dielectric layer 11.

The multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. The size of the multilayer ceramic capacitor 100 is not limited to these sizes.

The dielectric layer 11 includes, for example, a ceramic material having a perovskite structure represented by the general formula $ABO_3$ as a main phase. Note that the perovskite structure includes $ABO_{3-\alpha}$ that has off-stoichiometric composition. For example, the ceramic material can be at least one selected from $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), and $Ba_{1-x-y}Ca_xSr_yTi_{1-z}Zr_zO_3$ ($0 \leq x \leq 1$, $0 \leq y \leq 1$, $0 \leq z \leq 1$) forming a perovskite structure. $Ba_{1-x-y}Ca_xSr_yTi_{1-z}Zr_zO_3$ is barium strontium titanate, barium calcium titanate, barium zirconate, barium zirconate titanate, calcium zirconate titanate, barium calcium zirconate titanate, or the like.

As illustrated in FIG. 2A, a section where the internal electrode layers 12 connected to the external electrode 20a and the internal electrode layers 12 connected to the external electrode 20b are opposite to each other is a section where an electric capacitance is generated in the multilayer ceramic capacitor 100. Therefore, the section where the electric capacitance is generated is referred to as a capacitance section 14. That is, the capacitance section 14 is a section in which the adjacent internal electrode layers 12 connected to different external electrodes are opposite to each other.

A section where the internal electrode layers 12 connected to the external electrode 20a are opposite to each other with no internal electrode layer 12 connected to the external electrode 20b interposed therebetween is referred to as an end margin 15. In addition, a section where the internal electrode layers 12 connected to the external electrode 20b are opposite to each other with no internal electrode layer 12 connected to the external electrode 20a interposed therebetween is also the end margin 15. That is, the end margin 15 is a section where the internal electrode layers 12 connected to the same external electrode are opposite to each other with no internal electrode layers 12 connected to another external electrode interposed therebetween. The end margin 15 is a section where electric capacitance is not generated.

As illustrated in FIG. 2B, in the multilayer chip 10, a section from each of two side faces of the multilayer chip 10 to the corresponding edges of the internal electrode layers 12 is referred to as a side margin 16. That is, the side margins 16 are sections provided so as to cover the respective end portions of a plurality of the stacked internal electrode layers 12 extending toward the two side faces in the multilayered structure. The side margin 16 is also a section where electric capacitance is not generated.

Figure 3:
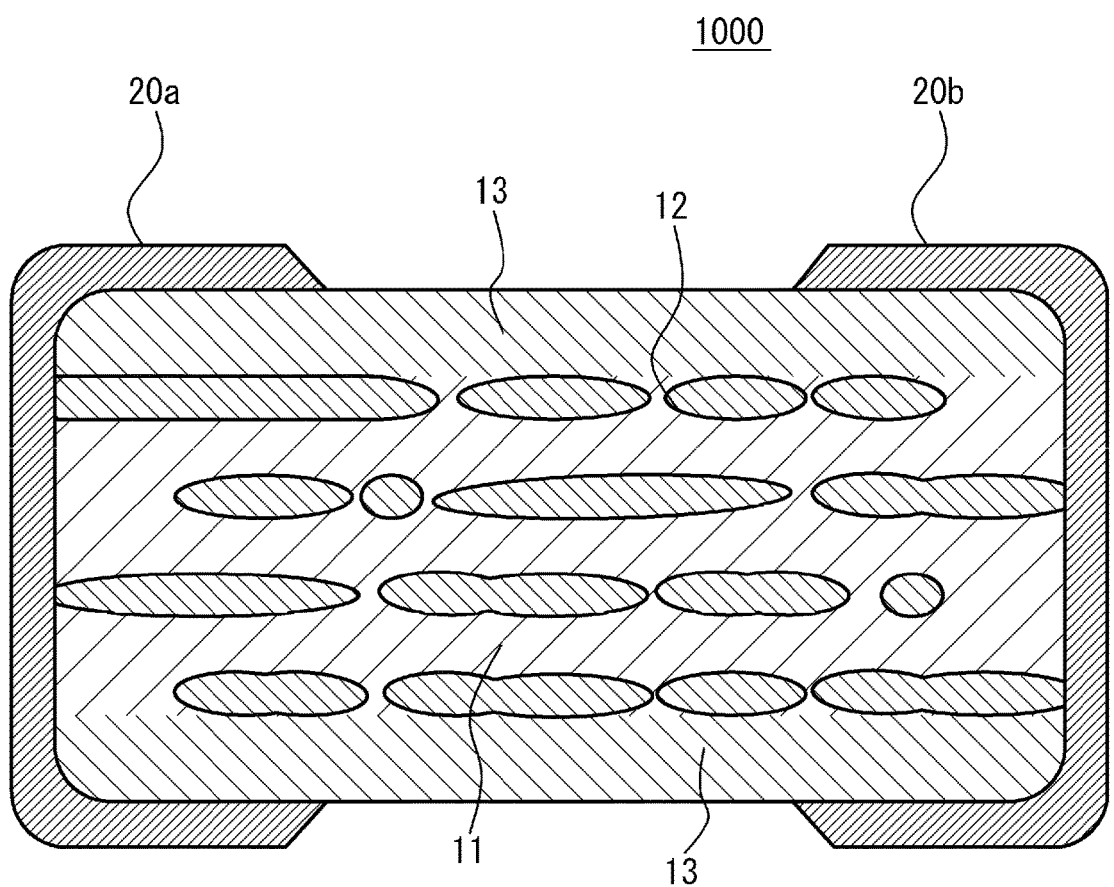
FIG. 3 is a schematic cross-sectional view of a multilayer ceramic capacitor in which internal electrode layers are thinned.

To reduce the size and increase the capacitance of the multilayer ceramic capacitor, the dielectric layers 11 and the internal electrode layers 12 are required to be thin. FIG. 3 is a schematic cross-sectional view of a multilayer ceramic capacitor 1000 in which internal electrode layers are thinned. The cross section of FIG. 3 corresponds to the cross section taken along line A-A in FIG. 1B.

When the thickness of the internal electrode layer 12 is to be thinned, it becomes difficult to maintain a high continuity rate. This is because of the following reasons.

When the internal electrode layer 12 is obtained by firing metal powder, the metal powder component of the internal electrode layer 12 is spheroidized to minimize the surface energy as the sintering proceeds. Since the sintering of the metal component of the internal electrode layer 12 proceeds more easily than that of the main component ceramic of the dielectric layer 11, when the temperature is raised until the main component ceramic of the dielectric layer 11 is sintered, the metal component of the internal electrode layer 12 is excessively sintered and tends to be spheroidized. In this case, if there is a break (defect), the internal electrode layer 12 is broken starting from the defect, and the continuity rate decreases as illustrated in FIG. 3.

Figure 4A:
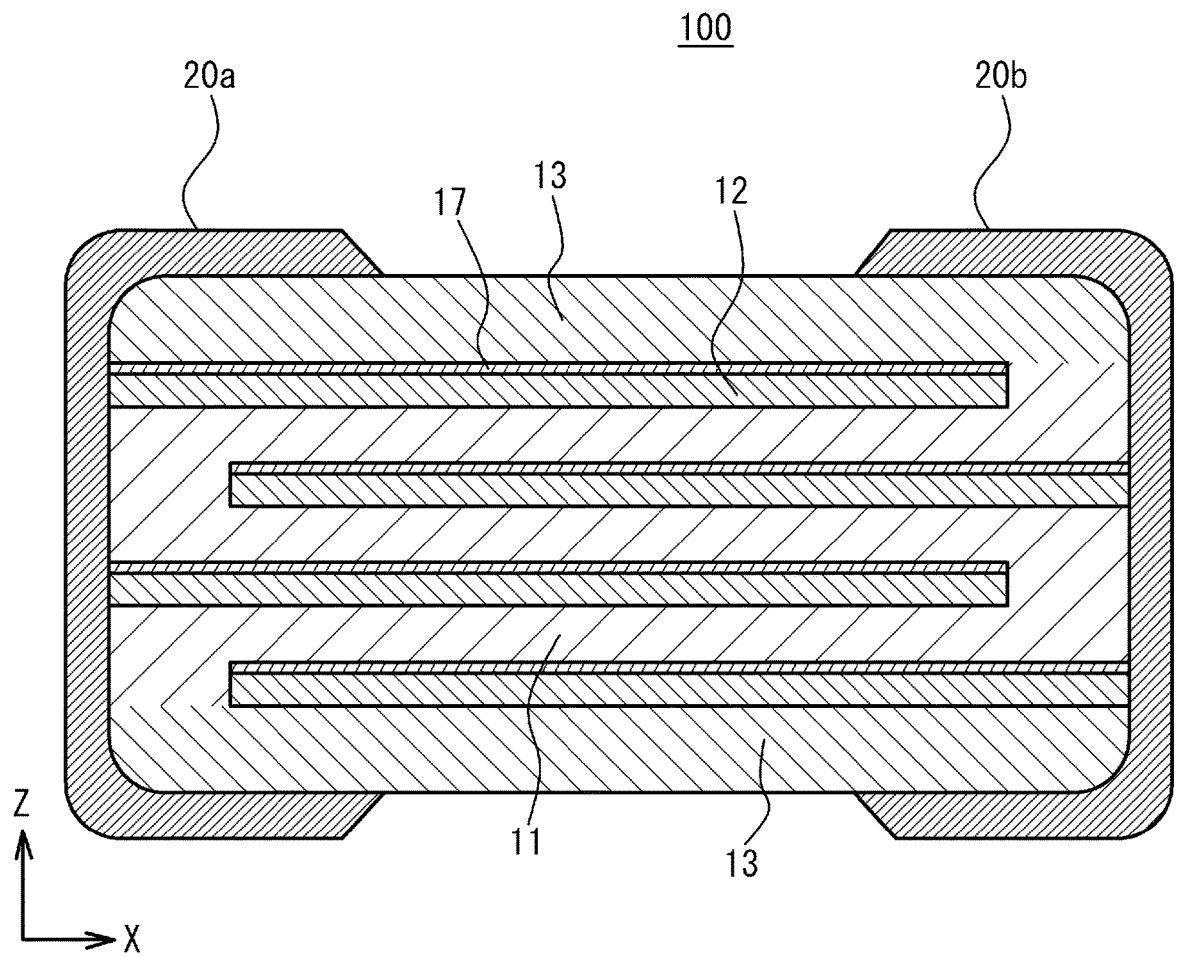
FIG. 4A and FIG. 4B are views for describing details of the vicinity of the boundary between the internal electrode layer and the dielectric layer.
Figure 4B:
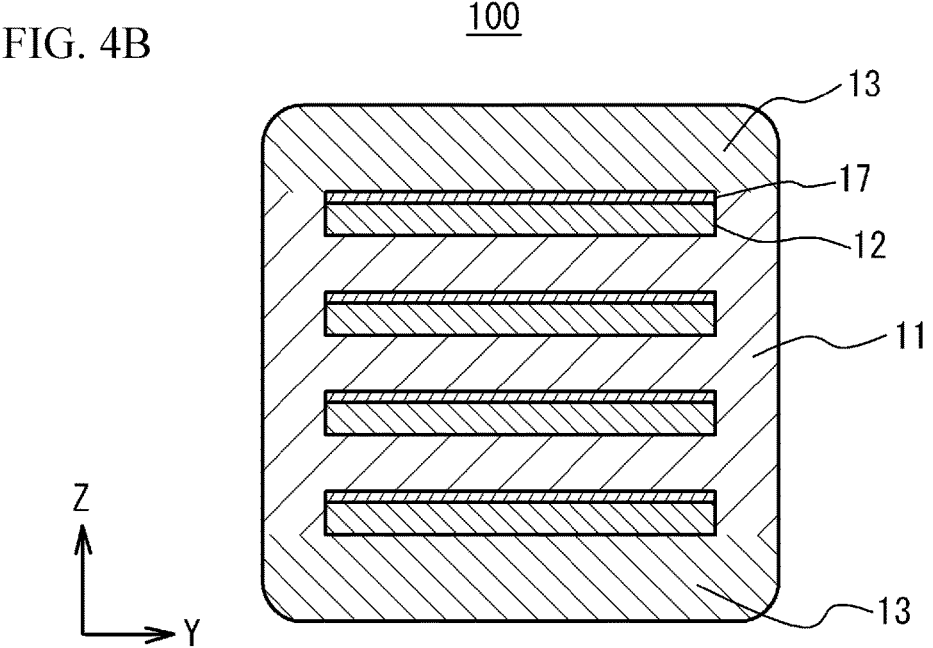

Therefore, in the multilayer ceramic capacitor 100 in accordance with the present embodiment, one of the upper and lower faces (first and second faces) of each internal electrode layer 12 is coated with a coating film 17 of an oxide of a metal (a second metal) that is more easily oxidized than the main component metal (a first metal) of the internal electrode layer 12. FIG. 4A and FIG. 4B are views for describing the details of the vicinity of the boundary between the internal electrode layer 12 and the dielectric layer 11. The number of the stacked internal electrode layers 12 in the cross-sectional views in and after FIG. 4A is different from the number of the stacked internal electrode layers 12 in the cross-sectional views of FIG. 2A and FIG. 2B. Specifically, in the cross-sectional views in and after FIG. 4A, the number of the stacked internal electrode layers 12 is four for the sake of clarity.

As illustrated in FIG. 4A and FIG. 4B, one of the upper and lower faces of the internal electrode layer 12 is coated with the coating film 17. The coating film 17 has, for example, a thickness of 1 nm to 50 nm in the stack direction.

The thickness of the coating film 17 in the stack direction can be obtained as follows. First, in the TEM image of the multilayer ceramic capacitor 100, the concentration of each component element is line-analyzed at each sample point along the stack direction of the dielectric layers 11 and the internal electrode layers 12, and the concentration of Ni and the concentration of Ti at each sample point in the stack direction are obtained. Then, the Ni concentration and the Ti concentration are differentiated, and the distance in the stack direction between the point at which the differential value of the Ni concentration is the largest value and the point at which the differential value of the Ti concentration is the smallest value is defined as the thickness of the coating film 17.

The ratio of the coating film 17 to the internal electrode layer 12 is 0.1 at % to 5 at %. The ratio of the coating film 17 to the internal electrode layer 12 is expressed by N2/(N1+N2)×100, where N1 represents the number of atoms of the main component metal of the internal electrode layer 12 and N2 represents the number of atoms of the metal in the metal oxide constituting the coating film 17 between the two adjacent dielectric layers 11. The ratio of the coating film 17 to the internal electrode layer 12 is preferably 3 at % or less, more preferably 1.5 at % or less.

The main component metal of the internal electrode layer 12 is, for example, nickel (Ni). In the case that the main component metal of the internal electrode layer 12 is Ni, the coating film 17 is a coating film of an oxide of chromium (Cr), aluminum (Al), or iron (Fe) that is more easily oxidized than Ni. The coating film 17 may not be required to be composed only of the oxide, and may contain other diffused elements. The main component metal of the internal electrode layer 12 is not limited to Ni, and may be a metal having a melting point close to that of Ni.

The other face of the upper and lower faces of the internal electrode layer 12 is not coated with the coating film 17, or the area of the coating film 17 covering the other face is smaller than the area of the coating film 17 covering the one face. The area of the coating film 17 covering the other face is equal to or less than ½ of, preferably equal to or less than ⅕ of, more preferably equal to or less than 1/10 of the area of the coating film 17 covering the one face.

Figure 5A:
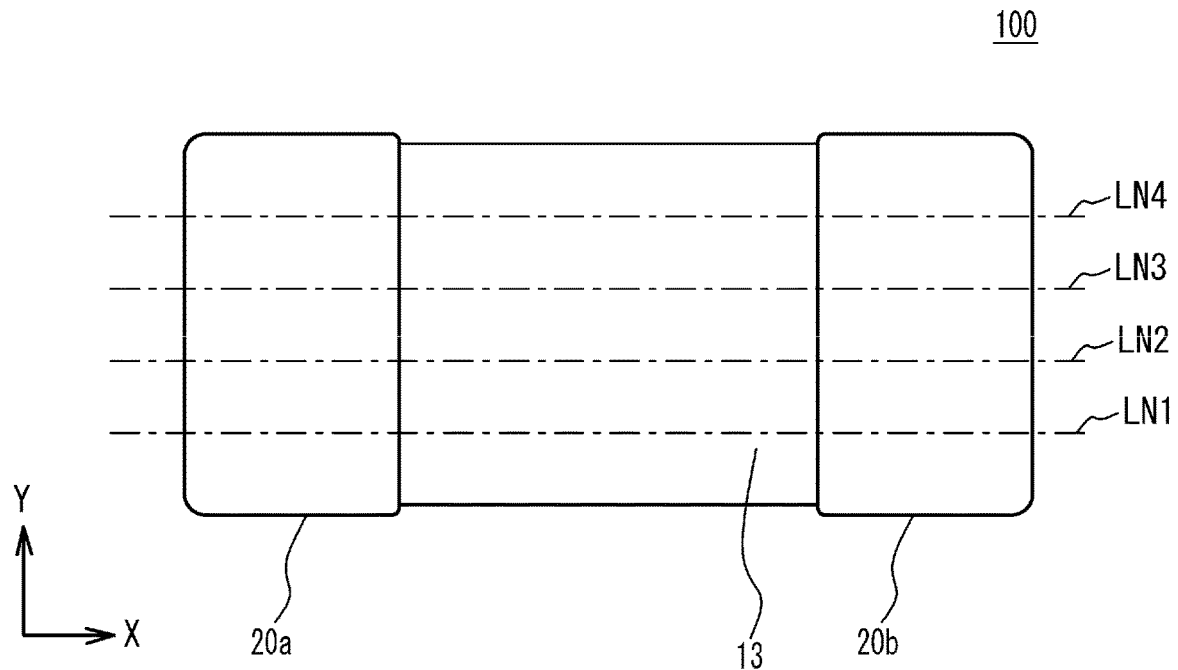
FIG. 5A and FIG. 5B are diagrams for describing estimation of a magnitude relationship between an area of a coating film covering the upper face of the internal electrode layer and an area of the coating film covering the lower face of the internal electrode layer.
Figure 5B:
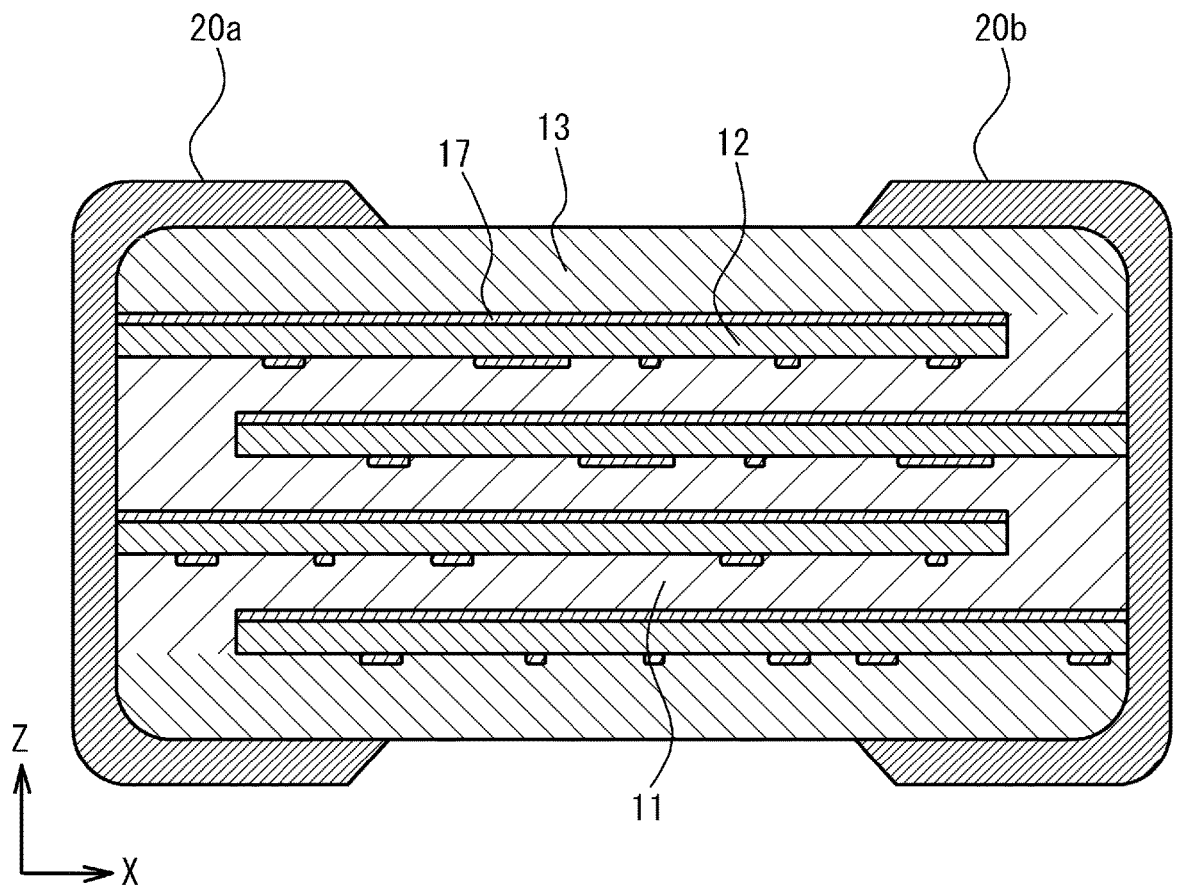

The magnitude relationship between the area of the coating film 17 covering the upper face of the internal electrode layer 12 and the area of the coating film 17 covering the lower face of the internal electrode layer 12 can be estimated as follows. FIG. 5A and FIG. 5B are diagrams illustrating estimation of a magnitude relationship between the area of the coating film 17 covering the upper face of the internal electrode layer 12 and the area of the coating film 17 covering the lower face of the internal electrode layer 12.

FIG. 5A is a top view of the multilayer ceramic capacitor 100. Scanning electron microscope (SEM) images of cut surfaces at a plurality of positions indicated by dashed-dotted lines in FIG. 5A in the width direction of the multilayer ceramic capacitor 100 are obtained.

FIG. 5B is a schematic cross-sectional view of the multilayer ceramic capacitor 100. In the SEM photograph of each cut surface, the respective lengths of the coating films 17 on the upper face and the lower face of the same internal electrode layer 12 are measured. For example, in the SEM image of the cross-section at the position indicated by a dashed-dotted line LN1 in FIG. 5A, the total length of the coating film 17 on the upper face of the internal electrode layer 12 is LU1 and the total length of the coating film 17 on the lower face is LL1, and in the SEM image of the cut surface at the position indicated by a dashed-dotted line LN2, the total length of the coating film 17 on the upper face of the internal electrode layer 12 is LU2 and the total length of the coating film 17 on the lower face is LL2. In the SEM image of the cut surface at the position indicated by a dashed-dotted line LN3, the total length of the coating film 17 on the upper face of the internal electrode layer 12 is LU3 and the total length of the coating film 17 on the lower face is LL3, and in the SEM image of the cut surface at the position indicated by a dashed-dotted line LN4, the total length of the coating film 17 on the upper face of the internal-electrode layer 12 is LU4 and the total length of the coating film 17 on the lower face is LL4. In this case, for example, when the sum (LU1+LU2+LU3+LU4) of the lengths of the coating films 17 on the upper faces of the internal electrode layers 12 in the respective cut surfaces is larger than the sum (LL1+LL2+LL3+LL4) of the lengths of the coating films 17 on the lower faces of the internal electrode layers 12 in the respective cut surfaces, it can be estimated that the area of the coating film 17 covering the upper face of the internal electrode layer 12 is larger than the area of the coating film 17 covering the lower face of the internal electrode layer 12.

The reason why the area of the coating film 17 on the lower face can be formed to be relatively small is that there is a possibility that the metal of the metal oxide constituting the coating film 17 on the upper face diffuses in the internal electrode layer 12 or from the disconnected portion of the internal electrode layer 12, and the coating film 17 is formed also on the lower face. In this case, the area covered with the coating film 17 on the lower face is smaller than that on the upper face.

Although the magnitude relationship of the area of the coating film 17 has been described, when the coating film 17 is formed by this mechanism, the coating film 17 in which the concentration of the metal of the metal oxide is lower than that of the coating film 17 on the upper face may be formed on the lower face. According to this analysis, the concentration difference between the upper and lower faces is 0.1 at % to 5 at %.

Figure 6A:
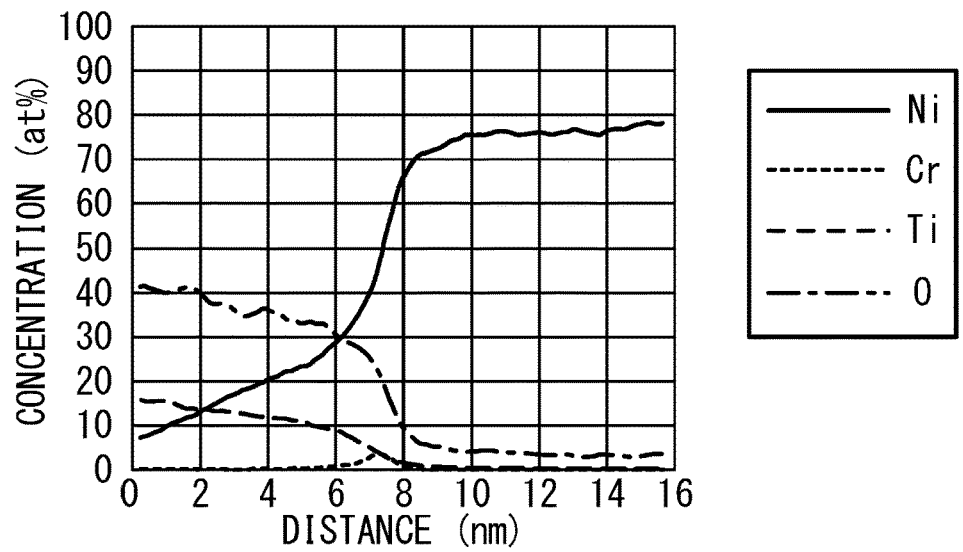
FIG. 6A to FIG. 6C are views illustrating analysis results when the concentration of each element was subjected to line analysis at each sample point along a stack direction of the dielectric layer and the internal electrode layer in a TEM image.
Figure 6B:
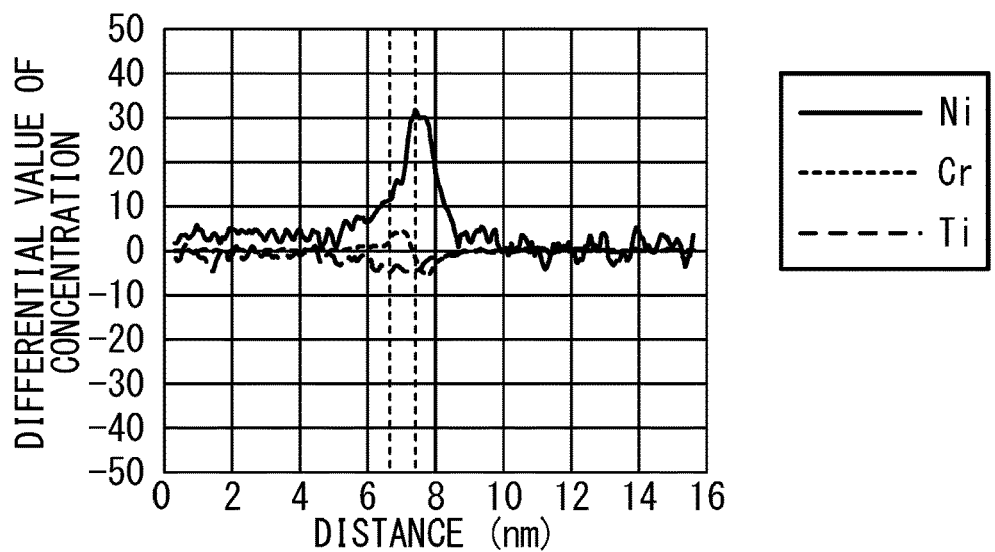
Figure 6C:
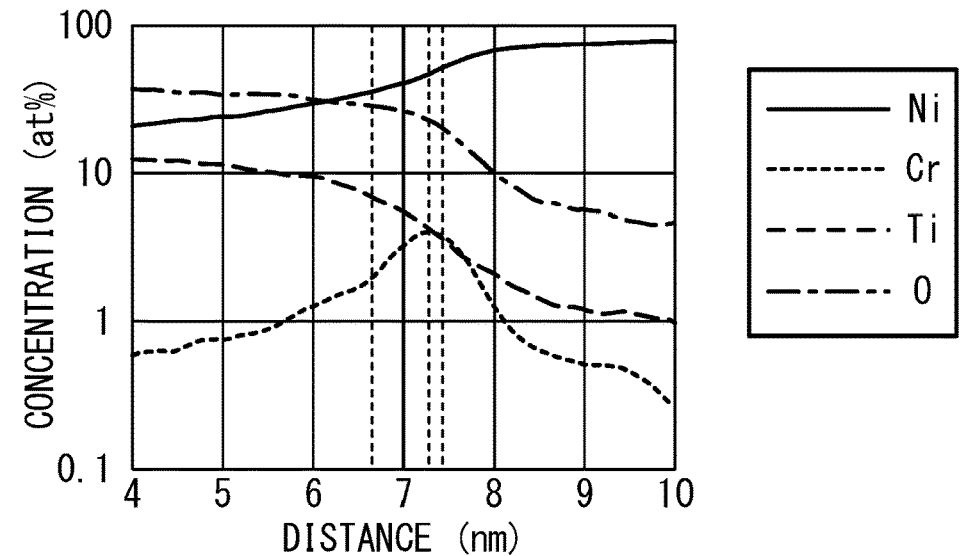

FIG. 6A to FIG. 6C are views illustrating analysis results when the concentration of each component element was subjected to line analysis at each sample point along the stack direction of the dielectric layers 11 and the internal electrode layers 12 in a TEM image of the multilayer ceramic capacitor 100. In the examples of FIG. 6A to FIG.

6C, as an example, Ni is used as the main component metal of the internal electrode layer 12, the coating film 17 is a chromium oxide film, and barium titanate is used as the main component ceramic of the dielectric layer 11.

Figure 7:
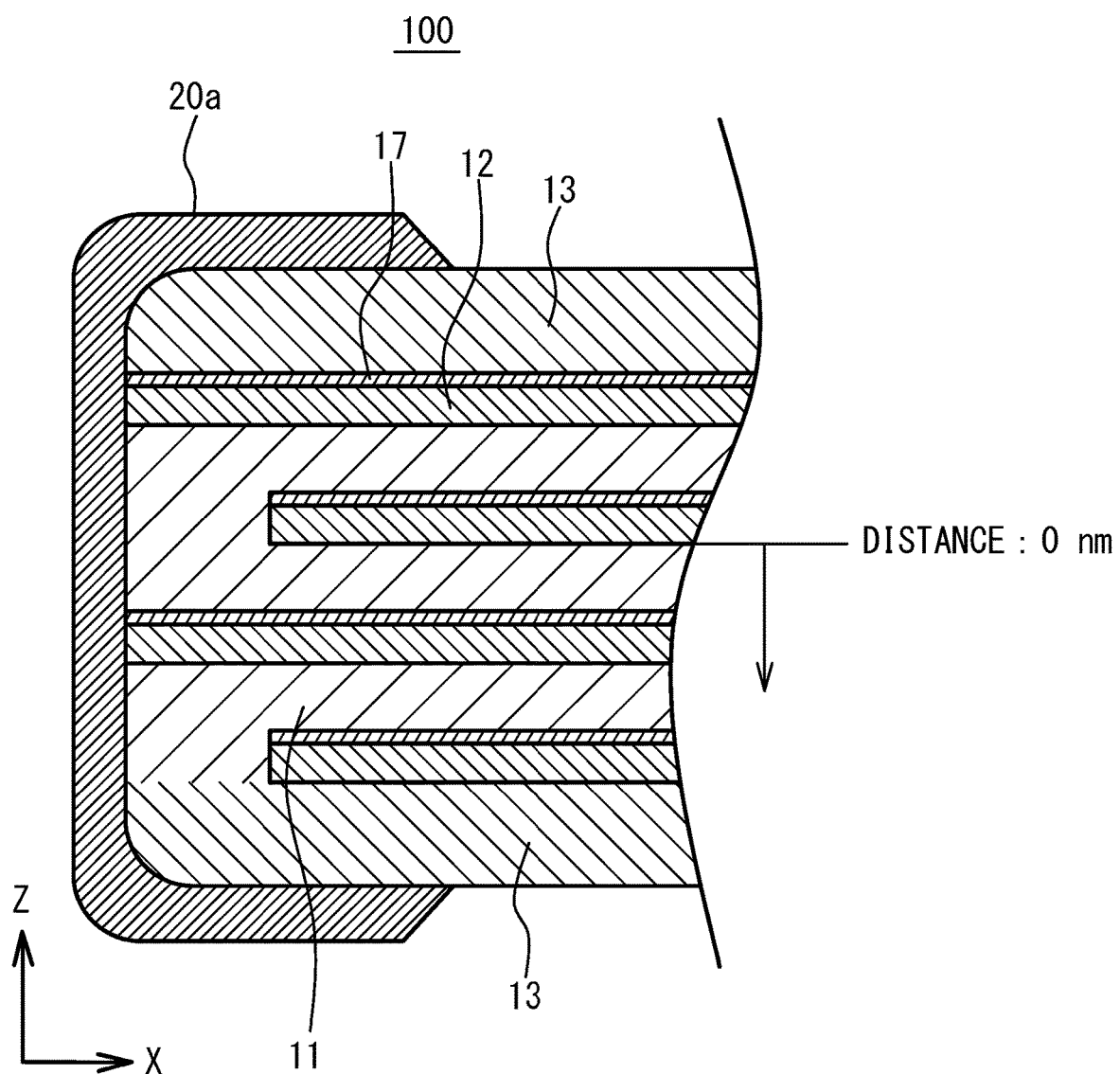
FIG. 7 is a diagram for describing the distance in FIG. 6A.

In FIG. 6A, the horizontal axis represents the distance in the stack direction, and the vertical axis represents the concentration (at %) of each component. As illustrated in FIG. 7, "0 nm" on the horizontal axis indicates a position expected to be the interface between the internal electrode layer 12 and the dielectric layer 11 in the multilayer ceramic capacitor in which the coating film 17 is formed on the upper face of the internal electrode layer 12. The distance on the horizontal axis increases at closer distances to another internal electrode layer 12 in the stack direction. As illustrated in FIG. 6A, the concentration of titanium (Ti) and the concentration of oxygen (O) constituting barium titanate, which is the main component ceramic of the dielectric layer 11, are highest at the distance "0 nm". The Ti concentration and the O concentration decrease at closer distances to another internal electrode layer 12, a peak appears in the chromium (Cr) concentration, and the concentration of nickel (Ni), which is the main component metal of the internal electrode layer 12, increases. Note that in the example of FIG. 6A, smoothing is performed by averaging nine points to reduce noise.

FIG. 6B illustrates results obtained by differentiating the Ni concentration, the Cr concentration, and the Ti concentration in FIG. 6A. By determining the steepest changing point, the interface of the internal electrode layer 12 and the interface of the dielectric layer 11 can be determined. In the example of FIG. 6B, the position where the differential value of the Ni concentration is the largest value is the interface of the internal electrode layer 12. The position where the differential value of the Ti concentration is the largest is the interface of the dielectric layer 11. A large amount of Cr is present between the interface of the dielectric layer 11 and the interface of the internal electrode layer 12.

FIG. 6C is a graph in which the vertical axis represents a logarithm of the result of FIG. 6A. As illustrated in FIG. 6C, a peak of the Cr concentration appears between the interface of the dielectric layer 11 and the interface of the internal electrode layer 12.

In such a configuration, since the spheroidization of the metal component of the internal electrode layer 12 is inhibited by the coating film 17 of the oxide of the metal more easily oxidized than the main component metal of the internal electrode layer 12, it is possible to improve the continuity rate of the internal electrode layer 12. In addition, since the coating film 17 covers one of the upper and lower faces of the internal electrode layer 12, induction of oxygen defects by the main component metal of the coating film 17 is inhibited more than in the case in which both faces of the internal electrode layer 12 are covered with the coating film 17. Thus, it is possible to obtain the multilayer ceramic capacitor 100 in which both the continuity of the internal electrode layers 12 and the insulation reliability of the dielectric layers 11 are achieved.

Figure 8:
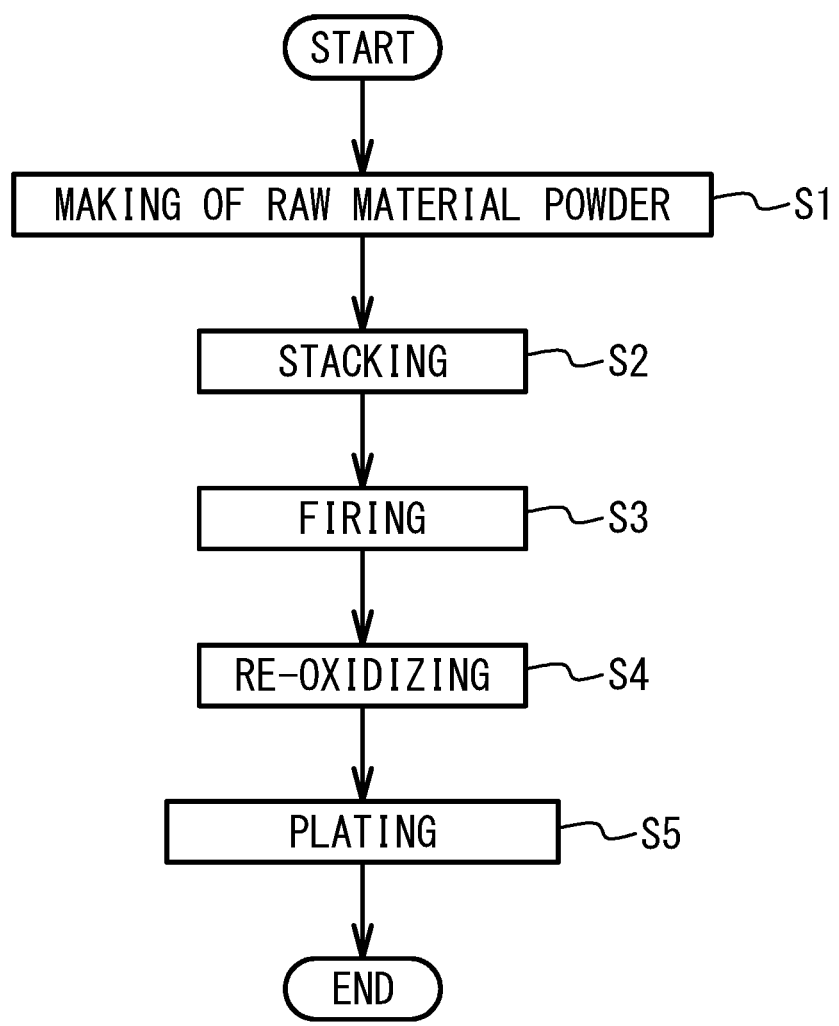
FIG. 8 is a flowchart illustrating a method of manufacturing the multilayer ceramic capacitor.

Next, a method of manufacturing the multilayer ceramic capacitor 100 will be described. FIG. 8 is a flow chart illustrating the method of manufacturing the multilayer ceramic capacitor 100.

Making of Raw Material Powder: S1

First, a dielectric material for forming the dielectric layer 11 is prepared. The A-site element and the B-site element contained in the dielectric layer 11 are typically contained in the form of a sintered body of $ABO_3$ particles. For example, $BaTiO_3$ is a tetragonal compound having a perovskite structure and exhibits high permittivity. $BaTiO_3$ can be generally obtained by reacting a titanium raw material such as titanium dioxide with a barium raw material such as barium carbonate to synthesize barium titanate. As a synthesis method of the ceramic constituting the dielectric layer 11, various methods are conventionally known, and for example, a solid phase method, a sol-gel method, a hydrothermal method, and the like are known. In the present embodiment, any of these can be adopted.

A predetermined additive compound is added to the resulting ceramic powder according to the purpose. Examples of the additive compound include oxides of manganese (Mn), vanadium (V), chromium (Cr), rare earth elements (yttrium (Y), dysprosium (Dy), thulium (Tm), holmium (Ho), terbium (Tb), ytterbium (Yb), samarium (Sm), europium (Eu), gadolinium (Gd), and erbium (Er)), and oxides of cobalt (Co), nickel (Ni), lithium (Li), boron (B), sodium (Na), potassium (K), and silicon (Si), and glass.

For example, a compound containing an additive compound is wet-blended with ceramic raw material powder, and the mixture is dried and crushed to prepare a ceramic material. For example, if necessary, the ceramic material obtained as described above may be crushed to adjust the particle size, or may be crushed and classified to adjust the particle size. Through the above steps, a dielectric material is obtained.

Stacking: S2

Then, a binder such as a polyvinyl butyral (PVB) resin, an organic solvent such as ethanol or toluene, and a plasticizer are added to the resulting dielectric material and wet-blended. The resulting slurry is applied on a base material 51 using, for example, a die coater method or a doctor blade method, and then dried to form a dielectric green sheet 52. The base material 51 is, for example, a polyethylene terephthalate (PET) film.

Figure 9A:
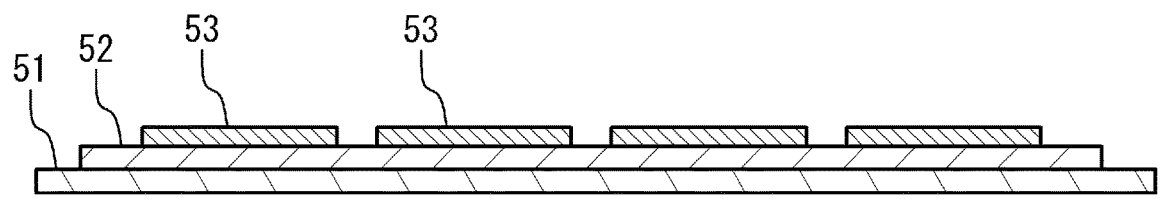
FIG. 9A to FIG. 9C illustrate a stacking process.

Next, as illustrated in FIG. 9A, internal electrode layer patterns 53 are formed on the dielectric green sheet 52. In FIG. 9A, as an example, four internal electrode layer patterns 53 are formed at predetermined intervals on the dielectric green sheet 52. In the present embodiment, the internal electrode layer patterns 53 are formed by sputtering using a target of the main component metal (for example, Ni) of the internal electrode layer 12.

Figure 9B:
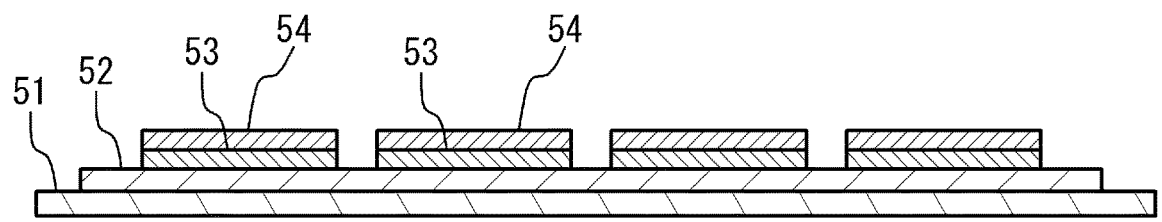

Next, as illustrated in FIG. 9B, coating film patterns 54 are formed on the respective internal electrode layer patterns 53. In the present embodiment, the coating film patterns 54 are formed by sputtering using a target of the metal (for example, Cr) of the metal oxide constituting the coating film 17. When the film formation amount of the coating film pattern 54 is too large, oxygen defects are induced, and the insulation reliability of the dielectric layer 11 is lowered as in the case in which both faces of the internal electrode layer 12 are covered with the coating films 17. On the other hand, when the film formation amount of the coating film pattern 54 is too small, the spheroidization of the main component metal of the internal electrode layer pattern 53 cannot be inhibited, and the decrease in the continuity rate cannot be reduced. Therefore, the ratio of the film formation amount of the coating film pattern 54 to the film formation amount of the internal electrode layer pattern 53 is set to 0.1 at % to 5 at %. The ratio of the film formation amount of the coating film pattern 54 to the film formation amount of the internal electrode layer pattern 53 is represented by $N4/(N3+N4) \times$ 100, where N3 is the number of atoms of the main component metal of the internal electrode layer 12 contained in the internal electrode layer pattern 53, and N4 is the number of atoms of the metal of the metal oxide constituting the coating film 17 contained in the coating film pattern 54. The ratio of the film formation amount of the coating film pattern 54 to the film formation amount of the internal electrode layer pattern 53 is preferably 3 at % or less, more preferably 1.5 at % or less.

The dielectric green sheet 52 on which the internal electrode layer patterns 53 and the coating film patterns 54 are formed is used as a stack unit.

Figure 9C:
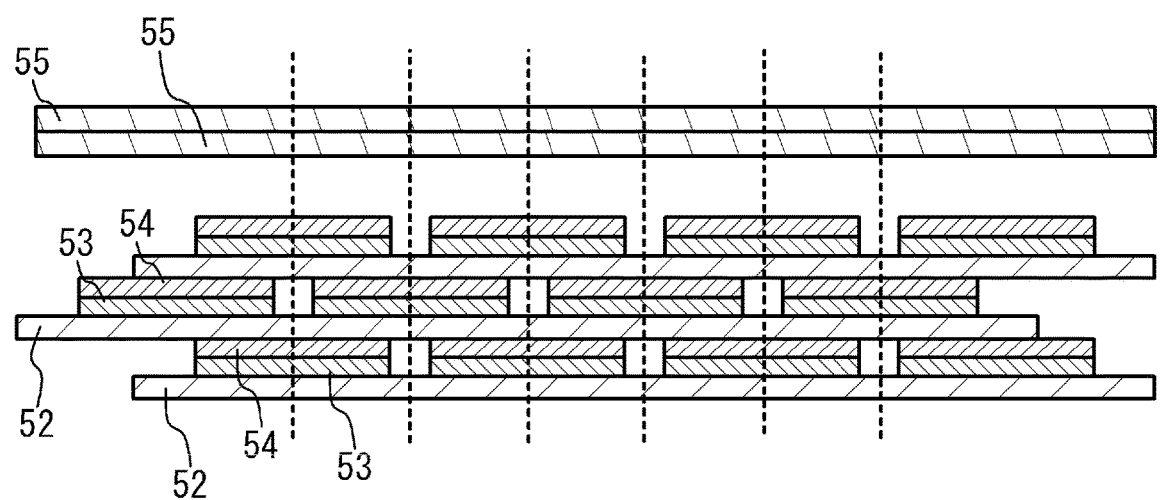

Then, as illustrated in FIG. 9C, the stack units are stacked while peeling off the dielectric green sheet 52 from the base material 51. Then, a predetermined number (for example, 2 to 10) of cover sheets 55 are stacked on and under the multilayer structure obtained by stacking the stack units, and the multilayer structure is heated and compressed, and is cut into a predetermined chip size (for example, 1.0 mm×0.5 mm). In the example of FIG. 9C, cutting along the dotted line is performed. The cover sheet 55 may have the same composition as the dielectric green sheet 52, or may have a different additive compound.

Firing: S3

A binder is removed from the resulting ceramic multilayer structure in an $N_2$ atmosphere, and then, metal pastes to be the base for the external electrodes 20a and 20b are applied by dipping, and then fired in a reduction atmosphere with an oxygen partial pressure of $10^{-5}$ to $10^{-8}$ atm in a temperature range of 1100° C. to 1300° C. for 10 minutes to 2 hours. During this step, the main component metal of the coating film pattern 54 is oxidized by oxygen in the reduction atmosphere or oxygen in the dielectric material. The main component metal of the coating film pattern 54 is more easily oxidized than the main component metal of the internal electrode layer pattern 53. Therefore, the coating film 17 is formed before the main component metal of the internal electrode layer pattern 53 is sintered, and the sintering of the main component metal of the internal electrode layer pattern 53 proceeds along the coating film 17. Thereby, spheroidization due to over-sintering of the main component metal of the internal electrode layer pattern 53 is inhibited, and the continuity rate of the internal electrode layer 12 obtained after the firing is improved.

Re-Oxidizing: S4

Thereafter, the re-oxidizing process may be performed in an $N_2$ gas atmosphere in a temperature range of 600° C. to 1000° C.

Plating: S5

Then, the base layers of the external electrodes 20a and 20b are coated with metals such as Cu, Ni, or Sn by plating. Through the above steps, the multilayer ceramic capacitor 100 is completed.

In the method of manufacturing the multilayer ceramic capacitor 100 in accordance with the present embodiment, the coating film pattern 54 containing, as a main component metal, a metal that is more easily oxidized than the main component metal of the internal electrode layer pattern 53 is formed on one face of the internal electrode layer pattern 53 by sputtering and is fired. As a result, firing of the main component metal of the internal electrode layer pattern 53 proceeds along the coating film 17 formed by oxidation of the main component metal of the coating film pattern 54. This inhibits spheroidization of the main component metal of the internal electrode layer pattern 53 due to over-sintering, and reduces a decrease in the continuity rate of the internal electrode layer 12. In addition, since the coating film pattern 54 is formed on one of the faces of the internal electrode layer pattern 53, compared to the case in which the coating film patterns 54 are formed on respective faces of the internal electrode layer pattern 53, generation of oxygen defects is inhibited, and the dielectric layer 11 having high insulation reliability can be obtained.

Figure 10A:
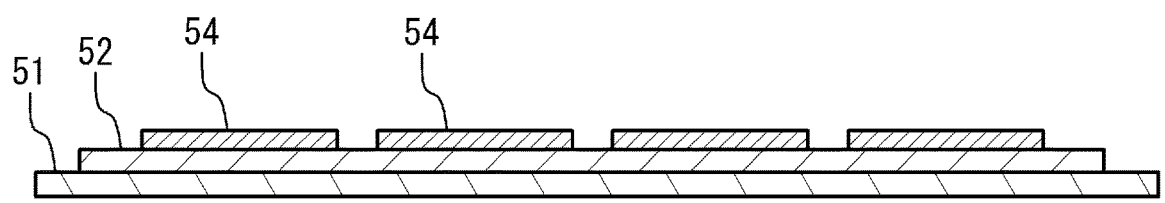
FIG. 10A to FIG. 10C illustrate another example of the stacking process.
Figure 10B:
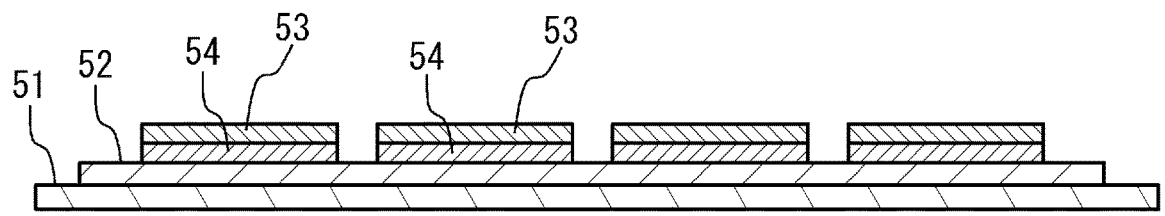
Figure 10C:
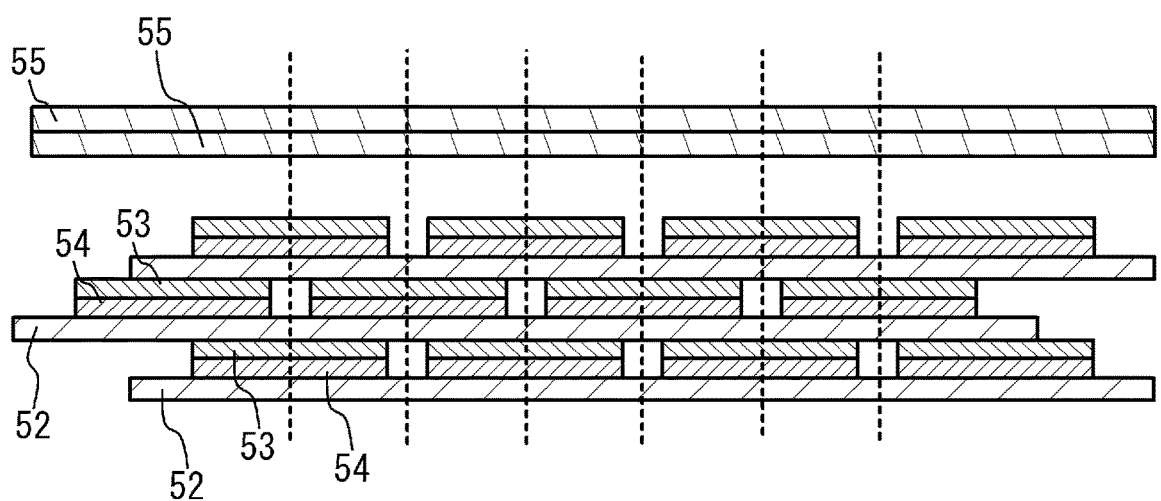

In the above embodiment, the internal electrode layer pattern 53 is formed on the dielectric green sheet 52, and the coating film pattern 54 is formed on the internal electrode layer pattern 53, but this does not intend to suggest any limitation. As illustrated in FIG. 10A and FIG. 10B, the coating film pattern 54 may be formed on the dielectric green sheet 52, and the internal electrode layer pattern 53 may be formed on the coating film pattern 54. In this case, the dielectric green sheet 52 on which the coating film pattern 54 and the internal electrode layer pattern 53 are formed is used as a stack unit. Then, as illustrated in FIG. 10C, the stack units are stacked while peeling the dielectric green sheet 52 from the base material 51.

Figure 11A:
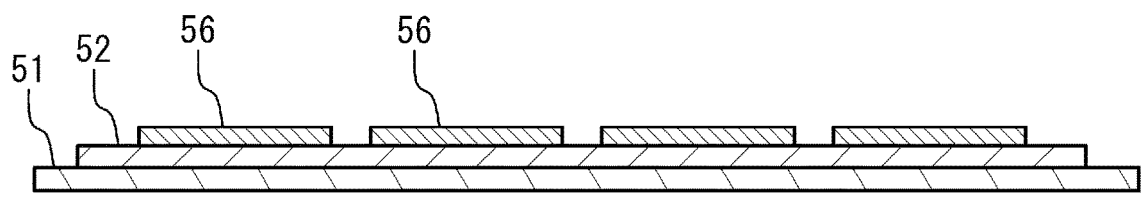
FIG. 11A and FIG. 11B illustrate another example of the stacking process.
Figure 11B:
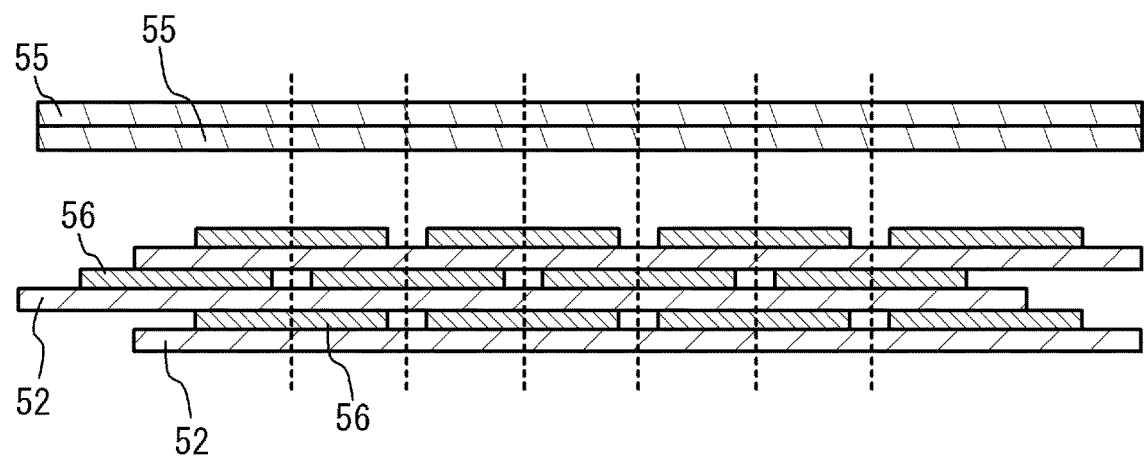

Alternatively, as illustrated in FIG. 11A, a composite pattern 56 containing the main component metal of the internal electrode layer 12 and the main component metal of the coating film 17 may be formed on the dielectric green sheet 52 by sputtering using a target of the main component metal of the internal electrode layer 12 and a target of the main component metal of the coating film 17. In this case, the dielectric green sheet 52 on which the composite pattern 56 is formed is used as a stack unit. Then, as illustrated in FIG. 11B, the stack units may be stacked while peeling the dielectric green sheet 52 from the base material 51.

When the target of the main component metal of the internal electrode layer 12 and the target of the metal of the metal oxide constituting the coating film 17 are simultaneously sputtered, the ratio of the metal of the metal oxide constituting the coating film 17 to the main component metal of the internal electrode layer 12 is adjusted to be 1 at % to 5 at %. When the number of atoms of the main component metal of the internal electrode layer 12 is N5 and the number of atoms of the metal of the metal oxide constituting the coating film 17 is N6, the ratio of the metal of the metal oxide constituting the coating film 17 to the main component metal of the internal electrode layer 12 is represented by N6/(N5+N6).

When the composite pattern 56 is fired in the firing step, the coating film 17 is formed mainly on the face exposed to the chamber of both faces of the composite pattern 56. As a result, firing of the main component metal of the internal electrode layer 12 proceeds along the coating film 17, and therefore, spheroidization due to over-sintering of the main component metal of the internal electrode layer 12 is inhibited, and the continuity rate of the internal electrode layer 12 is improved.

When the ratio of the main component metal of the coating film 17 is less than 1 at %, a sufficient amount of the coating film 17 is not formed on the upper face of the internal electrode layer 12 at the time of sputtering. In this case, spheroidization of the main component metal of the internal electrode layer 12 cannot be inhibited, and it cannot contribute to the improvement in the continuity rate of the internal electrode layer 12. The ratio of the main component metal of the coating film 17 is preferably 1 at % to 3 at %.

In this case, the continuity rate of the internal electrode layer 12 is further improved, and deterioration in reliability due to the main component metal of the coating film 17 is reduced.

In the above-described embodiment, the multilayer ceramic capacitor is described as an example of the ceramic electronic component, but this does not intend to suggest any limitation. For example, other electronic components such as a varistor and a thermistor may be used.

EXAMPLES

Multilayer ceramic capacitors according to the embodiment were fabricated, and characteristics thereof were examined.

Example 1

Additives were added to barium titanate powder, and the mixture was sufficiently wet-blended and crushed in a ball mill to obtain a dielectric material. An organic binder and solvents were added to the dielectric material, and a dielectric green sheet was obtained by applying the resulting slurry on a PET base material using a doctor blade method. The organic binder was a butyral-based binder. The solvents were toluene and ethyl alcohol. A composite pattern having a thickness of 200 nm was formed on the face of the dielectric green sheet by sputtering. More specifically, a composite layer of Ni and Cr was formed. The ratio of the Cr-target to the Ni-target was 3.1 at %. For the patterning, a mask method using a metal mask was employed. Ten dielectric green sheets on which the composite patterns were formed were stacked so that the composite patterns were alternately shifted, cut into a predetermined size, and metal conductive pastes for external electrodes were applied to two edge faces to which the composite patterns were exposed. Then, the resulting structure was fired to obtain a multilayer ceramic capacitor.

Comparative Example 1

In Comparative Example 1, when the internal electrode layer pattern was formed, the internal electrode layer pattern with a thickness of 200 nm was formed using only Ni. Other conditions were the same as in Example 1.

Figure 12:
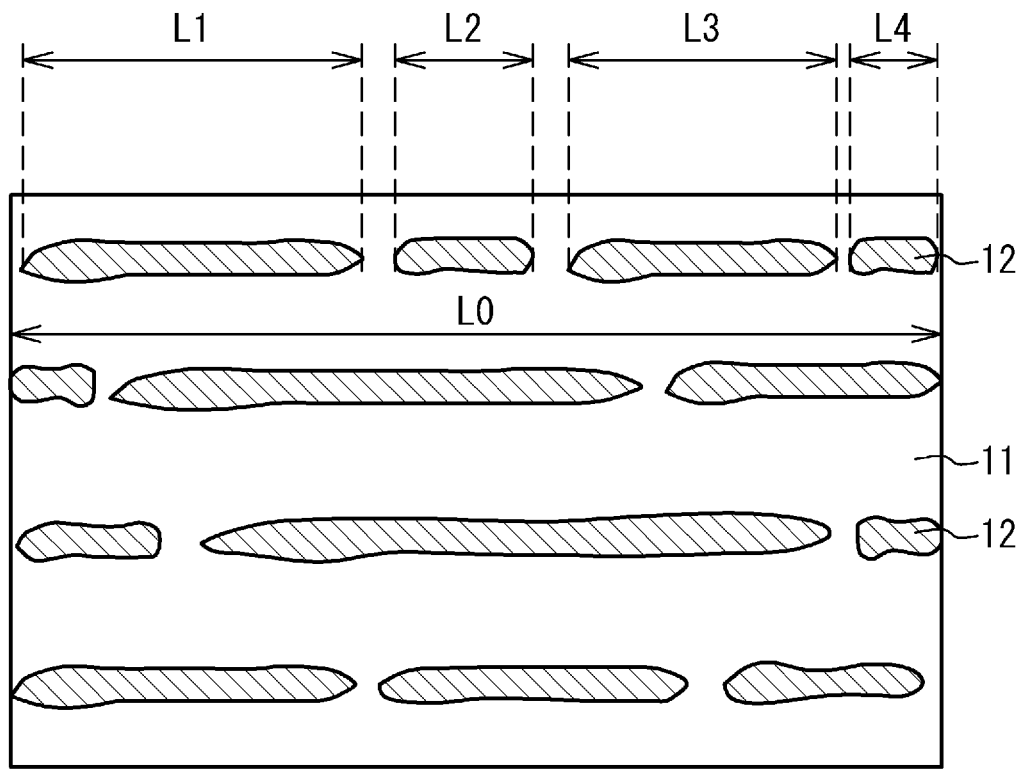
FIG. 12 is a diagram for describing the continuity rate.

The continuity rate of the internal electrode layer was measured for Example 1 and Comparative Example 1. FIG. 12 illustrates the continuity rate. As illustrated in FIG. 12, in the observation region with a length L0 in a certain internal electrode layer 12, the lengths L1, L2, . . . , Ln of the metal portions are measured and totaled, and the ratio of the metal portion $\Sigma$ Ln/L0 can be defined as the continuity rate of that layer.

Figure 13A:
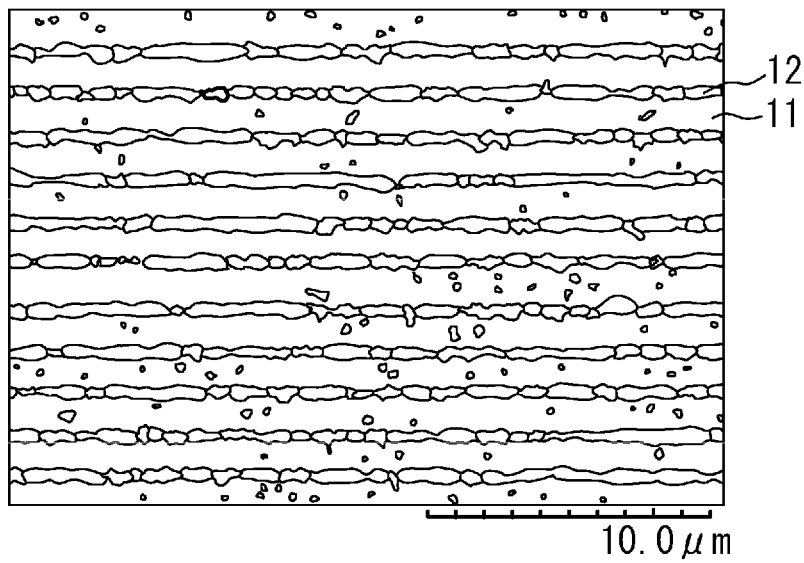
FIG. 13A is a cross-sectional SEM image of Comparative Example 1.
Figure 13B:
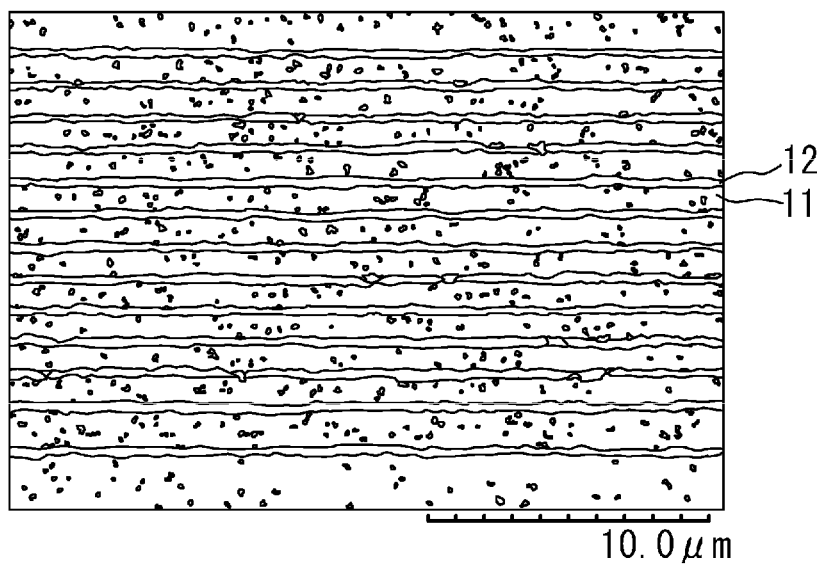
FIG. 13B is a cross-sectional SEM image of Example 1.

FIG. 13A is a cross-sectional SEM image of Comparative Example 1. FIG. 13B is a cross-sectional SEM image of Example 1. From the comparison result between FIG. 13A and FIG. 13B, a clear difference is observed in the continuity rate of the internal electrode layer, and it can be understood that the continuity rate was improved by disposing the Cr oxide film between the dielectric layer and the internal electrode layer. In Example 1, the continuity rate was measured to be 98%. In Comparative Example 1, the continuity rate was measured to be 70%.

Although the embodiments of the present invention have been described in detail, it is to be understood that the various change, substitutions, and alterations could be made hereto without departing from the spirit and scope of the invention.

What is claimed is:

1. A ceramic electronic component comprising:
a multilayer chip in which dielectric layers, which contain ceramic as a main component, and internal electrode layers, which contain a first metal as a main component, are alternately stacked,
wherein each of the internal electrode layers has a first face and a second face opposite to the first face in a same stack direction of the internal electrode layers, and each of the first face and the second face of each of the internal electrode layers is covered with a metal oxide film of a second metal that is more easily oxidized than the first metal, wherein an area of the metal oxide film covering the second face is smaller than an area of the metal oxide film covering the first face.

2. The ceramic electronic component according to claim 1, wherein the first metal is nickel.

3. The ceramic electronic component according to claim 1, wherein the metal oxide film is a chromium oxide film.

4. The ceramic electronic component according to claim 1, wherein a ratio of the metal oxide film to each corresponding internal electrode layer is 0.1 at % to 5 at %.

5. The ceramic electronic component according to claim 4, wherein a ratio of the metal oxide film to each corresponding internal electrode layer is 3 at % or less.

6. The ceramic electronic component according to claim 4, wherein a ratio of the metal oxide film to each corresponding internal electrode layer is 1.5 at % or less.

7. The ceramic electronic component according to claim 1, wherein the area of the metal oxide film covering the second face is equal to or less than ½ of the area of the metal oxide film covering the first face.

8. The ceramic electronic component according to claim 1, wherein the internal electrode layers are constituted by an internal electrode material containing the first metal, wherein an entire area of the first face of each of the internal electrode layers, which is constituted by the internal electrode material, is covered with the metal oxide film of the second metal.

9. A ceramic electronic component comprising:
a multilayer chip in which dielectric layers, which contain ceramic as a main component, and internal electrode layers, which are constituted by an internal electrode material containing a first metal as a main component, are alternately stacked,
wherein each of the internal electrode layers has a first face and a second face opposite to the first face in a same stack direction of the internal electrode layers, wherein an entire area of the first face of each of the internal electrode layers, which is constituted by the internal electrode material, is covered with a metal oxide film of a second metal that is more easily oxidized than the first metal, and the second face of each of the internal electrode layers is not covered with the metal oxide film.

10. The ceramic electronic component according to claim 9, wherein the first metal is nickel.

11. The ceramic electronic component according to claim 9, wherein the metal oxide film is a chromium oxide film.

12. The ceramic electronic component according to claim 9, wherein a ratio of the metal oxide film to each corresponding internal electrode layer is 0.1 at % to 5 at %.

13. The ceramic electronic component according to claim 12, wherein a ratio of the metal oxide film to each corresponding internal electrode layer is 3 at % or less.

14. The ceramic electronic component according to claim 12, wherein a ratio of the metal oxide film to each corresponding internal electrode layer is 1.5 at % or less.

* * * * *